United States Patent [19]

Dixon

[11] 4,219,366

[45] Aug. 26, 1980

[54] ADHERENT COATING FOR ENTRAPPING CONTAMINATION PARTICLES IN GAS-INSULATED ELECTRICAL APPARATUS

[75] Inventor: George D. Dixon, Monroeville, Pa.

[73] Assignee: Westinghouse Electric Corp., Pittsburgh, Pa.

[21] Appl. No.: 928,639

[22] Filed: Jul. 27, 1978

[51] Int. Cl.$^2$ .......................... B08B 7/00; B08B 9/00; B08B 15/00
[52] U.S. Cl. .................................... 134/4; 134/22 R; 174/14 R; 427/335
[58] Field of Search .......................... 134/4, 42, 22 R; 174/14 R; 55/435; 427/335; 260/847, 848

[56] References Cited

U.S. PATENT DOCUMENTS

| | | | |
|---|---|---|---|
| 3,327,017 | 6/1967 | Huang et al. | 260/847 X |
| 3,438,931 | 4/1969 | Mitchell et al. | 260/847 X |
| 3,765,941 | 10/1973 | Gordon | 134/42 |
| 3,911,937 | 10/1975 | Sletten et al. | 134/4 X |

Primary Examiner—Marc L. Caroff
Attorney, Agent, or Firm—M. S. Yatsko

[57] ABSTRACT

A tacky or sticky coating is provided on selected surface areas inside compressed gas-insulated systems to trap conducting and semiconducting particles which, if allowed to remain free, can promote breakdown between metallic parts or electrodes maintained at different potentials, or which may initiate tracking and flashover along insulating surfaces. The initially hard, dry coating is comprised of a binder component and an active component. The binder component is chemically inert to both the insulating gas within the apparatus and a solvent vapor, while the active component is capable of interacting with the solvent vapor to become tacky. The insulating coating, after exposure to the solvent vapor, becomes tacky on the surface to thereon entrap contamination particles, but the addition of the binder component prevents the coating from sagging but instead maintains its spatial position on the selected surface areas.

7 Claims, 11 Drawing Figures

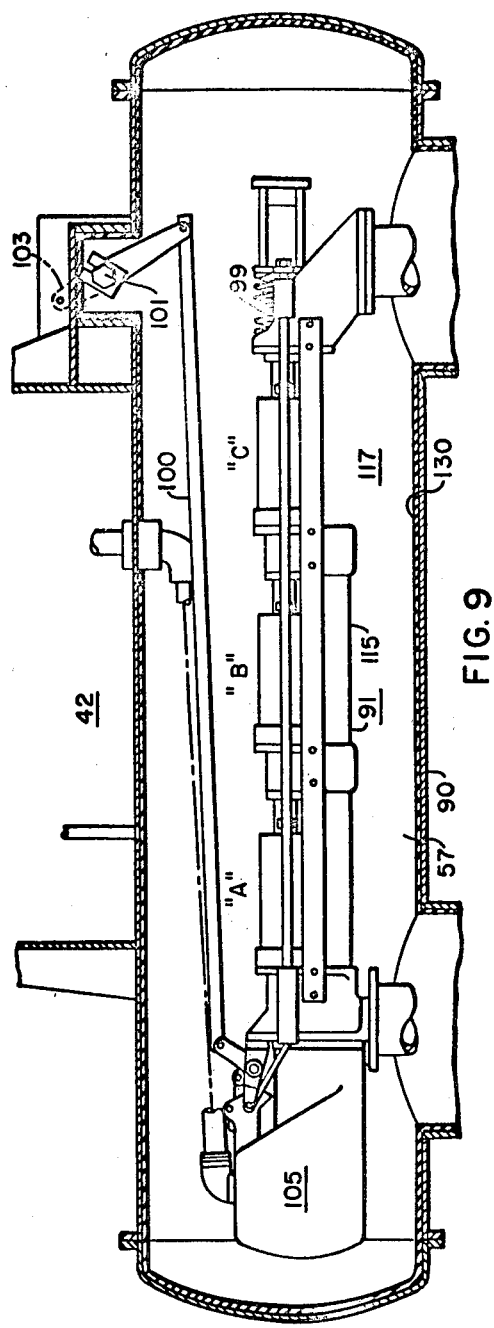
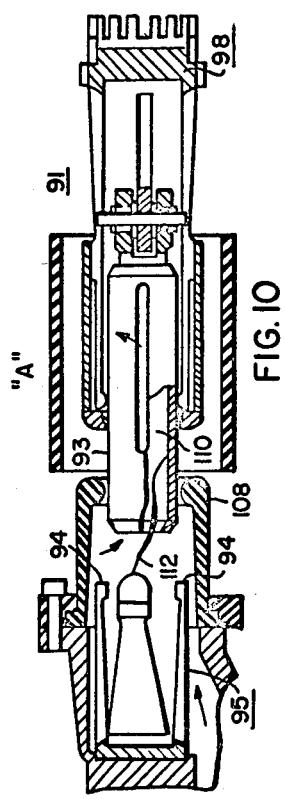

ADHERENT COATING FOR ENTRAPPING CONTAMINATION PARTICLES IN GAS-INSULATED ELECTRICAL APPARATUS

BACKGROUND OF THE INVENTION

It has been demonstrated that metallic contamination, such as flakes of plating, light metallic turnings, or small coil-shaped pieces from tapped holes in electrical equipment are responsive to the electrostatic field in the gas gap between the high-potential electrode parts, and the outer grounded metallic tank, particularly used in gas-filled circuit breakers. At voltage stress levels below normal service-stress levels, this contamination assumes a charge, and commonly aligns with the electrical voltage gradient. Some shapes or pieces move at random about the floor of the surrounding tank, and others may levitate to contact the upper end of other moving particles, or attach themselves to the high-potential electrode, or contact parts, where again they may wander at random with a luminous discharge at the point of contact. Breakdown sometimes occurs at voltage stresses below the normal line-to-ground voltage of the circuit-breaker application. Such phenomena occur in gas-insulated circuit breakers and gas-insulated transmission lines.

In recent years, there has been an effort to reduce the installation land area for substations due to the expense of real estate, or land near large urban areas, and a line of gas-insulated transmission equipment has been designed and sold to supply this utility need for reduced installation areas. The following patents illustrate the general types of equipment involved, and set forth descriptions of pieces, or components of gas-insulated equipment suitable for supplying relatively heavy currents at high voltages within relatively small enclosures: U.S. Pat. No. 3,448,202, D. L. Whitehead; U.S. Pat. No. 3,361,870, D. L. Whitehead; U.S. Pat. No. 3,610,807, D. L. Whitehead; U.S. Pat. No. 3,378,731, D. L. Whitehead; U.S. Pat. No. 3,331,911, D. L. Whitehead; U.S. Pat. No. 2,173,717, H. M. Hobart; U.S. Pat. No. 2,221,670, F. S. Cooper; U.S. Pat. No. 3,515,939, J. G. Trump; U.S. Pat. No. 2,216,010, H. M. Hobart; U.S. Pat. No. 3,345,450, H. E. Spindle; U.S. Pat. No. 2,221,671, F. S. Cooper; and U.S. Pat. No. 3,585,270, J. G. Trump.

In equipment described in the patents above, the problem exists with small metallic or insulating particles being present and reducing the breakdown voltage between metallic parts at different voltage levels, or reducing parts at different voltage levels, or reducing the flashover voltage along insulating surfaces, particularly along support insulators or spacers.

One method utilized in the prior art to overcome this problem is present in U.S. Pat. No. 3,856,978, and its divisional, U.S. Pat. No. 3,911,937, To Sletten et al. These patents describe the use of either thermosetting or polyvinyl copolymer coatings which are placed on selected surface areas within gas-insulated apparatus. The coating of these patents is initially hard, but is rendered sticky or tacky either by heating means or by the introduction of a solvent vapor. However, one possible disadvantage of the coatings described in these patents is that, for use with a solvent vapor, the ability of this coating to remain tacky for extended periods of time is unknown. In the gas-insulated apparatus in which the invention is utilized, it may be desirable to provide the tacky coating to entrap particles for period of time up to, for example, twenty years. One problem with the coatings described in the two patents is that, as the solvent vapor causes the coating to become tacky, over longer periods of time the coating may possibly be attacked throughout and thereby sag. If this occurs, the coating would, instead of maintaining their locations where initially placed, may instead, by forces of gravity, sag or slide to the lowermost portions of the gas-insulated apparatus. This sagging results from the fact that the solvent vapor, because of its interaction with the coating to render its surface tacky, may interact with the entire coating, and not just its surface, and cause the entire coating to flow.

SUMMARY OF THE INVENTION

In accordance with this invention, an initially relatively-hard, dry insulating coating is provided on selected surface areas within gas-insulated electrical apparatus. The insulating coating is comprised of a binder component chemically inert to both the insulating gas and a solvent vapor within the electrical apparatus, and an active component which is capable of interacting with a solvent vapor to become tacky. After exposure to the solvent vapor, the insulating coating becomes tacky on the surface thereof to entrap contaminating particles, but does not sag or lose its spatial position on the locations where it was originally applied. This non-sagging characteristic is made possible because of the presence of the binder component which is inert to the effects of the solvent vapor, thereby not rendering that portion of the insulating coating tacky or fluid.

BRIEF DESCRIPTION OF THE DRAWINGS

FIG. 9 is an enlarged vertical sectional view taken through the circuit-breaker structure of FIG. 6, the contact structure being illustrated in the closed-circuit position;

FIG. 10 is an enlarged fragmentary vertical cross-sectional view of the circuit-breaker structure of FIG. 9, showing the contacts in the partly open-contact position; and FIG. 11 is a longitudinal cross-sectional view of a gas-filled cable-length embodying the present invention.

DESCRIPTION OF THE PREFERRED EMBODIMENT

Figure 1:
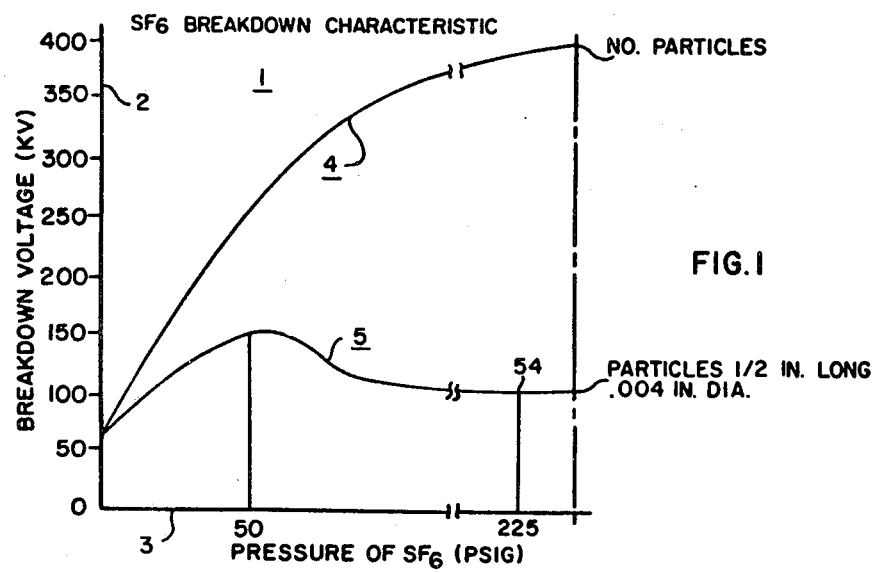
FIG. 1 shows a breakdown characteristic curve for sulfur-hexafluoride gas.

Referring now to the drawings and to FIG. 1 in particular, a sulfur-hexafluoride ($SF_6$) gas insulation breakdown characteristic 1 is depicted wherein alternating breakdown voltage in kilovolts (rms) is measured on the ordinate 2 and pressure in pounds per inch gauge is measured on the abscissa 3. Plot or curve 4 shows the breakdown characteristics between two concentric coaxial electrodes with diameter three and ten inches respectively for sulfur-hexafluoride gas with virtually no particles present. On the other hand, plot or graph 5 shows the breakdown characteristics between the same two coaxial electrodes for sulfur-hexafluoride gas which has one-half inch long by 0.004 inch diameter cylindrical particles immersed in it. As can be seen by inspecting characteristic or graph 1, sulfur-hexafluoride inslating gas with particles present breaks down at a relatively much lower voltage than the same gas without particles present. In an improved type of circuit interrupter as described in FIGS. 6, 9 and 10, more fully described hereinafter, sulfur-hexafluoride gas 6 is maintained at elevated pressure. However, unless the sulfur-hexafluoride gas-insulated system is relatively particle-free, as is seldom the case, the breakdown voltage will be drastically reduced compared to the case with no particles present.

Figure 2:
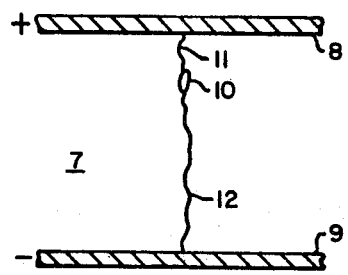
FIG. 2 shows a set of capacitor plates with an interposed particle.
Figure 3:
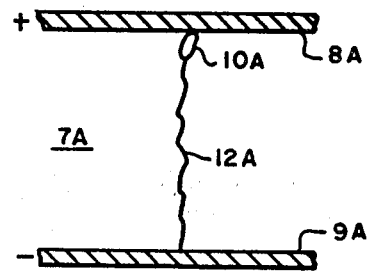
FIG. 3 shows a set of capacitor plates with an interposed particle.

The reason that the pressurized sulfur-hexafluoride gas insulating medium 6 with contaminating particles immersed in it does not properly insulate may be understood by referring to FIGS. 2 and 3. In FIG. 2, a parallel-plate capacitor arrangement 7 having a high-voltage capacitor plate or conductor 8 and a low-voltage capacitor plate or conductor 9 is shown. Interposed between plates 8 and 9 is a particle 10. Particle 10 may be metallic in nature, and may be an electrically conducting or semiconducting particle. In FIG. 2, particle 10 is shown in a position proximate or close to parallel plate or conductor 8, whereupon it is thought that a small electrical discharge may take place between the particle 10 and the conductor 8. The discharge 11 may cause a discharge 12 to continue from particle 10 to negative conductor or capacitor plate 9 thus causing a complete electrical breakdown between capacitor plates 8 and In FIG. 3 a similar parallel-plate capacitor arrangement 7A having a positive conductor or plate 8A and a negative conductor or plate 9A is shown. A similar particle 10A is shown attached to or abutting against plate 8A. It is thought in this instance that the protrusion caused by particle 10A jutting or projecting from plate 8A creates a point where there is a relatively high concentration of electric stress and from where a voltage breakdown, as indicated by jagged line 12A, may easily occur. Regardless of which theory explains the breakdowns described, it is clear that the presence of particles 10 or 10A, as shown in FIG. 2 or FIG. 3, respectively, is a significant cause of electrical breakdown between conductors at different potentials.

Figure 4:
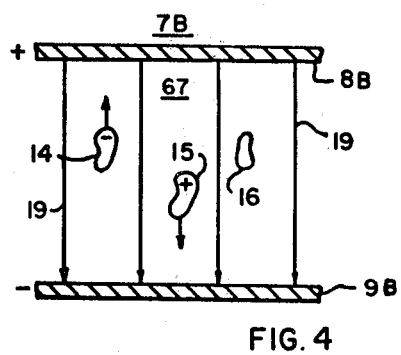
FIG. 4 shows a set of capacitor plates with interposed charged particles and electrical field lines.

Referring now to FIG. 4, another parallel-plate capacitor 7B is shown wherein parallel-plate capacitor 7B has a positive electrically conducting plate 8B and negative electrically conducting plate 9B. Interposed between plates 8B and 9B is a plurality of particles 14, 15 and 16. Some particles, such as particle 16, have no charge and are not subjected to a mechanical force from the electric field. Other particles, such as particle 14, have a negative charge and are thus attached to positively charged capacitor plate or electrode 8B, while a third type of particle, such as particle 15, has a positive charge and is attracted to the negatively charged capacitor plate 9B. These charged particles are subjected to forces due to the influence of the electrical field 19 between plates 8B and 9B. As can be seen by reference to FIGS. 2 and 3, if the charged particles 15 and 14 in FIG. 4 migrate or move to the plates of the respective opposite polarities, the "trigatron" effect or the "abutting electrical particle" effect may occur causing a discharge or breakdown between plates 8B and 9B. Of course, it may also be possible for the particles 14 and 15 to migrate to the respective plates of opposite polarity 8B and 9B and merely discharge without causing a breakdown between capacitor plates 8B and 9B. In this case, the respective particles 14 and 15 will merely acquire the potential of the plates 8B and 9B respectively, to which they have migrated and begin to move towards the oppositely charged plates 9B and 8B respectively. These phenomena could possibly continue independently, only occasionally causing a breakdown in the gaseous insulation, as discussed previously.

Figure 5:
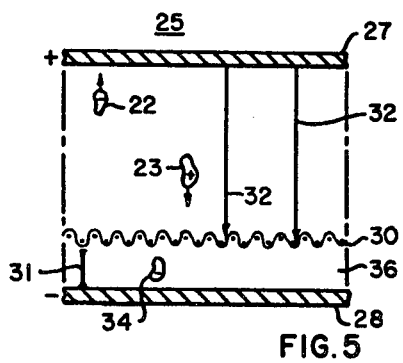
FIG. 5 shows a set of capacitor plates with a metallic grid particle trap.

Referring now to FIG. 5, a proposed well-known method for preventing voltage breakdowns, due to migrating charged particles, such as 22 and 23, is shown in the capacitor combination 25 which includes a pair of oppositely charged electrodes or plates 27 and 28 and a metallic grid or screen 30, which is grounded or connected to one electrode 28 by a conductor 31. In this case, particles 23 and 22, corresponding to particles 15 and 14 in FIG. 4, migrate, as previously described. However, the electric field, shown by lines 32, extends only to the metallic grid 30, since it is at the same potential or voltage level as plate or conductor 28. Consequently, any particle, such as particle 34, which has filtered through the grid or screen 30 finds itself in a near zero electrical field, or field-free region 36 wherein no forces exist due to the electric field 32 to cause the particle 34 to migrate or move to the oppositely charged plate 27. U.S. Pat. No. 3,515,939, J. G. Trump, issued June 2, 1970 explains more of the theory of the functioning of the metallic screen 30.

The particles are of course subjected to gravity forces, buoyancy forces, mutual electrostatic attraction or repulsion, frictional forces when moving relative to the gas and in non-uniform electric fields to dielectrophoretic forces which act even on non-charged particles. Particle impacts on electrodes result also in more or less elastic bounding of particles. Particles also exchange charge with the gas when electric fields cause a gaseous discharge to occur making charge carries available in the gas. If the main electric potential applied to the electrodes varies with time as the case is in alternating voltage systems the motion of the particles become very complex and no attempt will be made here to provide a complete description of the motion.

Figure 6:
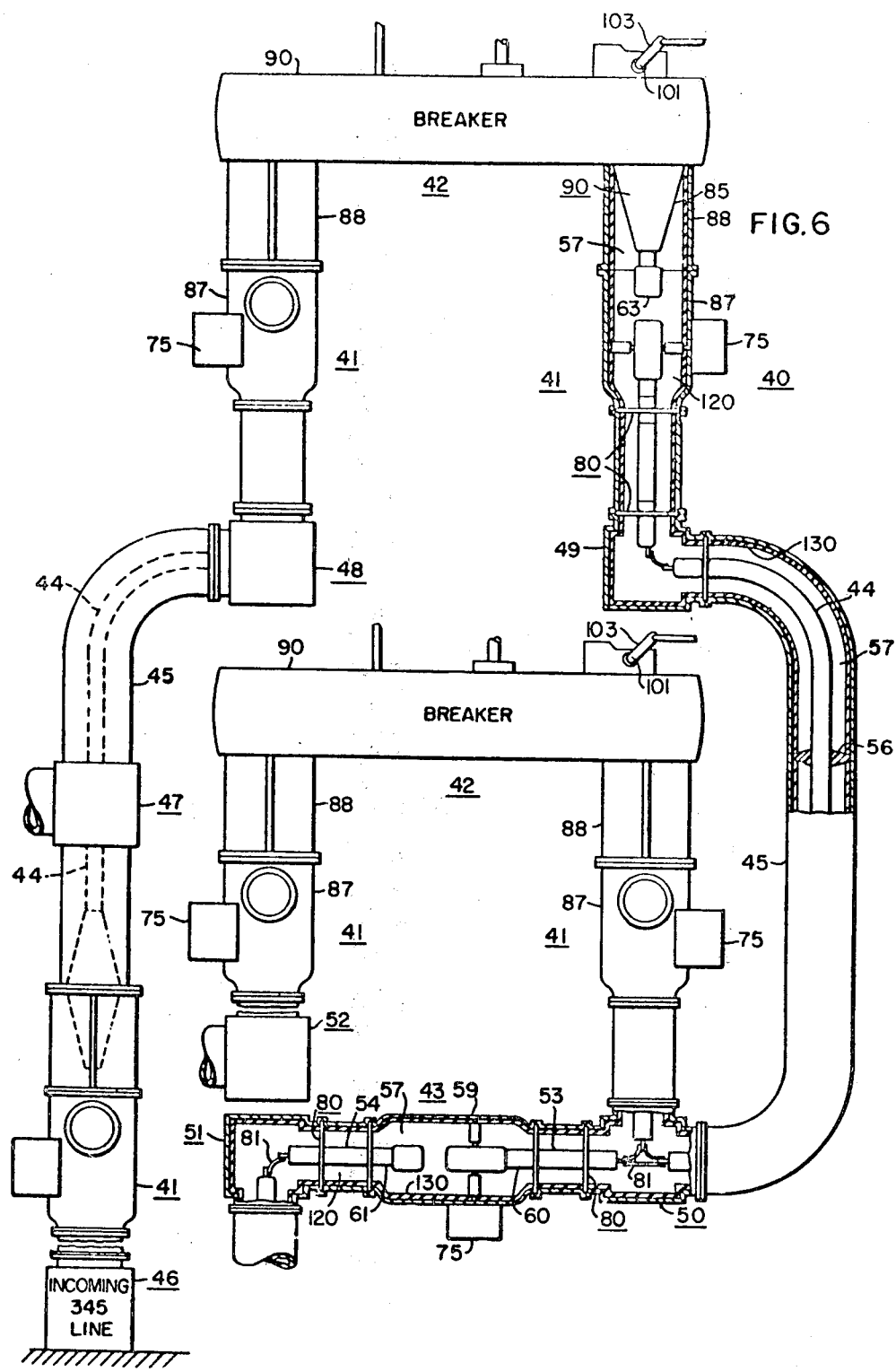
FIG. 6 is a view, in elevation, of a portion of a substation structure embodying features of the present invention.

Referring to FIG. 6 of the drawings, the structure shown therein capable of embodying the present invention comprises one pole unit 40 of a distribution substation. Additional pole units 40, similar to the one shown, may be provided as required. Each pole unit 40 comprises a plurality of vertical disconnect switches 41, circuit breakers 42, and a horizontal disconnect switch 43 which are interconnected by generally cylindrical bus conductors 44 enclosed in generally cylindrical housings 45 which are joined by various junction boxes 46 to 52 inclusive. Thus, an incoming high-voltage line connected to the junction box 46 may be connected through a vertical disconnect switch 41, a bus conductor 44, a junction box 47, a bus conductor 44, a junction box 48, a vertical disconnect switch 41, a circuit breaker 42, a vertical disconnect switch 41, a junction box 49, a bus conductor 44, a junction box 50, a bus conductor 53, the horizontal disconnect switch 43, a bus conductor 54, and the junction box 51 to a transformer (not shown). Another high-voltage line may be connected to the system through the junction box 47. Likewise, an additional high-voltage line may be connected to the junction box 52 and thence to the transformer through a vertical disconnect switch 41, a circuit breaker 42, a vertical disconnect switch 41, the junction box 50 and the horizontal disconnect switch 43. Thus, the transformer may be connected to different power sources.

As shown, the bus conductors 44, 53, 54 are supported inside the cylindrical housings 45 by generally disc-shaped insulators 56. The housings 45, the disconnect switches 41 and 43 and the circuit breakers 42 contain an insulating gas 57, preferably sulfur-hexafluoride ($SF_6$) gas, under pressure. The circuit breakers 42 may be of a gas-blast type, such as, for example, the one described in U.S. Pat. No. 3,154,658, issued Oct. 27, 1964, and shown more clearly in FIGS. 4 and 5 of the drawings hereinafter more fully described.

Figure 8:
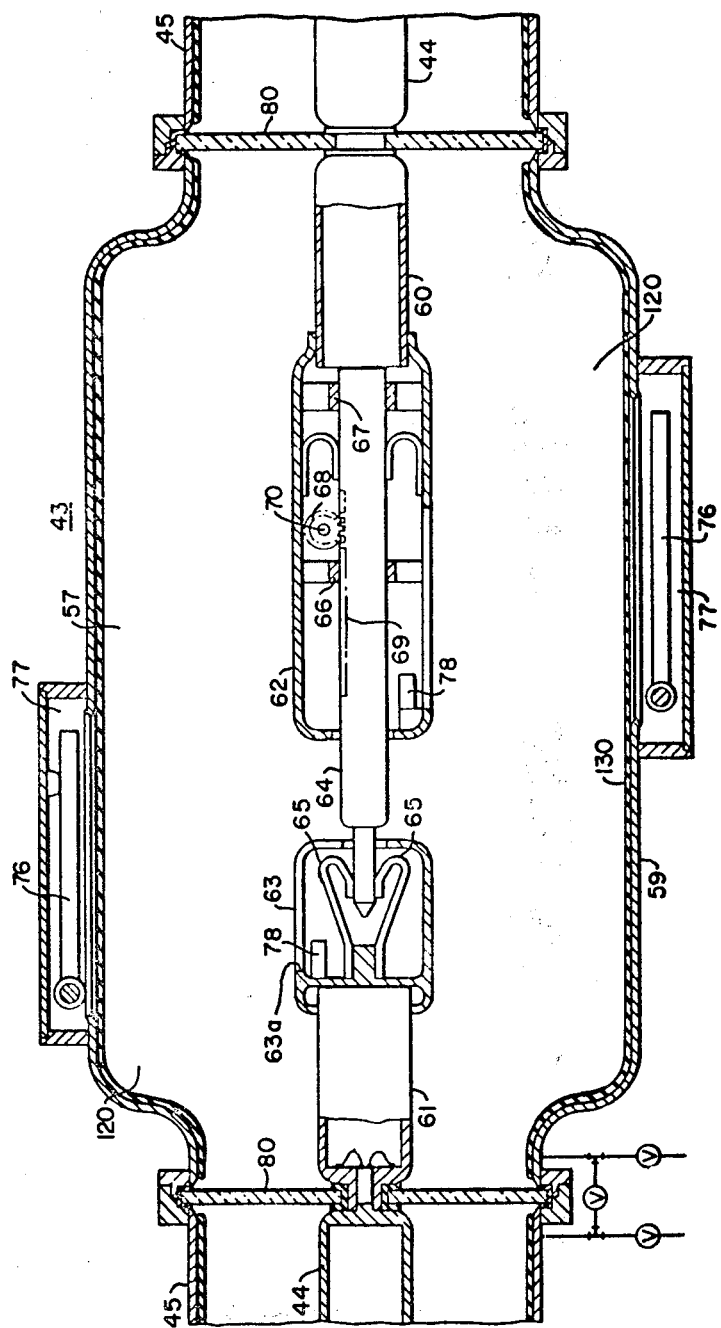
FIG. 8 is a view similar to FIG. 7, of the horizontal disconnecting switch shown in FIG. 6, again the contacts being shown closed.

The structure of the horizontal disconnect switch 43 is shown in more detail in FIG. 8. The switch 43 comprises a generally cylindrical housing 59 which contains longitudinally spaced cylindrical switch conductors 60 and 61, a generally cylindrical grading shield or electrode 62 having one end attached to one end of the conductor 61, and a reciprocating switch-blade 64 which engages breakjaw contact fingers 65 when in the closed position, as shown.

The switch-blade 64 is slidably disposed in guide bearings 66 and 67 mounted inside the electrode 62. The blade 64 is slidably engaged by contact fingers 65 also mounted inside the electrode 63. The reciprocating switch-blade 64 may be actuated by a gear 68 which drives a rack 69 secured to the blade 64. The blade 64 may be actuated by other suitable operating means, if desired.

Figure 7:
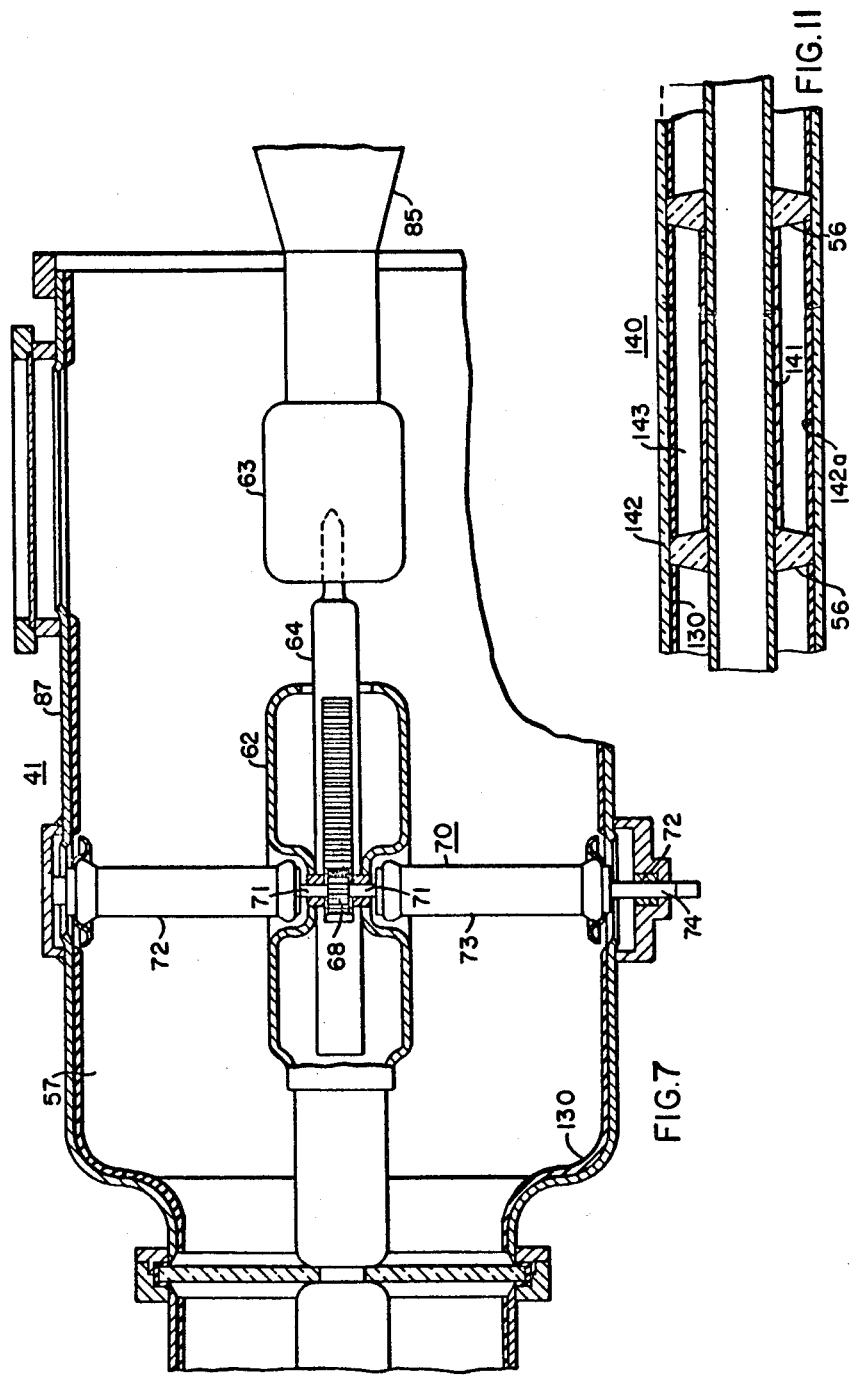
FIG. 7 is an enlarged view, partly in section, and partly in elevation, of one of the vertical disconnecting switches shown in FIG. 6, the contacts being shown closed.

As shown more clearly in FIG. 7, the gear 68 is driven by an insulating shaft 70 rotatably mounted in sealed bearings 71 and 72 disposed in bearing housings. The insulating shaft 76 comprises a short shaft 71 on which the gear 68 is mounted and insulating members 72 and 73 attached to opposite ends of the shaft 70. An extension 74 is attached to one end of the insulating member 73 extends through the bearing 72 and may be rotated by a suitable mechanism, such as a motor-operated mechanism 75, as shown in FIG. 6.

As shown in FIG. 8, a grounding switch-blade 76 is pivotally mounted in a recessed portion 77 of the housing 59. The blade 76 may be actuated by suitable means to engage a grounding contact jaw 78 disposed inside the electrode 63. A suitable slot 63a is provided in the wall of the electrode 63 to permit the end of the blade 76 to enter the electrode 63. Thus, the portions of the bus structure 44 connected to the electrodes 62 and 63 may be grounded through the grounding switch-blade 76 since the switch housing 59 as well as the bus-conductor housings 45 are grounded.

The combined insulator and barrier units 80 may be of the type fully described in U.S. Pat. No. 3,331,911.

The insulator 80 is preferably composed of a synthetic resin, thereby having sufficient flexibility to take care of thermal expansion in the current conductors. As shown in FIG. 6, flexible connectors 81 may be utilized in the junction boxes 46–52 of the bus structure to take care of expansion of the bus conductors.

The vertical disconnect switch 41 shown in FIGS. 6 and 7 are similar to the horizontal switch 43 with the exception that the breakjaw assembly 63 is supported by a terminal bushing 85 of the circuit breaker 42 with which the disconnect switch 41 is associated. As shown in FIG. 6, the housing 87 of the disconnect switch 41 is attached to a housing portion 88 of the circuit breaker 42 which encloses the terminal bushing 90 of the circuit breaker. Further details regarding the description and operation of the electrical equipment illustrated in FIGS. 6–8 are set forth and described in U.S. Pat. No. 3,348,001 issued Oct. 17, 1967 to Upton et al. which is incorporated herein by reference.

FIGS. 9 and 10 generally illustrate in more detail the type of circuit-breaker structure 42 which may be used in combination with the substation equipment 40. The circuit breaker 42 is more specifically set forth in detail in U.S. Pat. No. 3,154,658, issued Oct. 27, 1964 to R. G. Colclaser, Jr. et al. As set forth in said U.S. Pat. No. 3,154,658, a plurality of breaks "A", "B" and "C" are provided longitudinally in series relationship within an outer grounded tank structure 90 and constitute an arc-extinguishing assemblage 91. A portion of the arc-extinguishing assemblage 91 is illustrated in FIG. 10, which shows the first unit A of the multi-break arc-extinguishing assemblage 91. As shown in FIG. 10, a movable tubular contact 93 makes engagement with stationary finger contacts 94 of a stationary contact structure 95. The moving tubular contact 93 is only one of a number of movable contacts associated with a movable contact assemblage 98, which generally comprises a ladder-like moving assemblage, which is biased to the open-circuit position by accelerating springs 99 (FIG. 9), and is maintained in the closed-circuit position, as shown in FIG. 9, by an operating rod 100 linked to a horizontal operating shaft 101 connected to any suitable mechanism, not shown, by an externally provided operating lever 103.

During the opening operation, the operating mechanism (not shown) is released to permit thereby the accelerating springs 99 to effect a quick opening of the several movable contacts 93, only one of which is illustrated in FIG. 10. Simultaneously with the releasing action, heretofore mentioned, a gas-blast valve (not shown) is opened to permit a blasting of high-pressure $SF_6$ gas 57 from a high-pressure tank 105 through an insulating nozzle 108 (FIG. 10), and into the interior 110 of the moving tubular contact 93 to effect the extinction of the arc 112 therein. Simultaneously with the blasting action of the gas 57 within the first arc-extinguishing unit A, additional gas flows through a manifold structure 115 and into the second and third breaks B and C, not shown, but each of which is similar to the first break A, illustrated in detail in FIG. 10. Because of the establishment of a plurality of series breaks, A, B, ad C, each of which is subjected to a flow of $SF_6$ gas under pressure, arc extinction quickly ensues, and the circuit is interrupted.

It will be observed that the $SF_6$ gas 57 which is present within the region 117 within the tank structure 90 of the circuit-breaker structure 42, is also present at the same pressure throughout the system 120.

During the operation of the electrical structures described above in FIGS. 6 to 10, experience has shown that there may be small or minute particles 68 (FIG. 2)

which may move or levitate within the region or settle on insulating surfaces. It is desirable to trap or captivate these conducting or insulating particles 68 preferably in a region with low electric field so as to maintain a high dielectric strength between the inner component parts, which are at high voltage, and the outer grounded casing 45, 59, 88 and 90. It is the purpose of the present invention to captivate these particles 68 by providing a coating 130 which is applied selectively on the inner surface of the enclosure. This coating 130 is hard or non-tacky during the assembly operations, and it is only at a subsequent time that, through entrance of a solvent vapor, as more fully described hereinafter, that the surface of the coating 130 will be rendered sticky or tacky thereby catching the minute conducting particles 68.

FIG. 11 illustrates a portion of a high-voltage transmission system 140 in which a high-voltage conductor 141 is spaced interiorly within the outer grounded sheath 142 also preferably having a high-dielectric strength gas disposed therein, such as sulfur-hexafluoride (SF$_6$) gas for example. Again, the coating 130 may be provided on the inner wall 142a of the outer grounded sheath 142 as previously mentioned.

The insulating coating 130 which is provided within the electrical apparatus is initially relatively hard and dry to facilitate the ease in applying the coating 130. The coating 130 itself is made of two different components which are pre-mixed together to form the coating 130. A binder component, which is chemically inert to the insulating gas and to the solvent vapor, is utilized to hold together the coating and to prevent the sagging of the coating after exposure to the solvent vapor for extended periods of time. An active component is mixed with the binder component to enable the coating 130 to have a surface tackiness for entrapping contaminated particles 68. The active component is of a material which is capable of interacting with the solvent vapor to thereafter become tacky. As the solvent vapor interacts, or attacks, the active component, the active component is dissolved by the solvent vapor, thereby causing a stickiness or a tackiness thereto. Since the active component is combined with the binder component, and intermixed throughout the coating 130, only the surface area of the coating 130 becomes tacky due to the interaction with the solvent vapor, and the binder assures that the spatial location of the coating 130 itself is maintained. By so using the two different components to form the insulating coating 130, applicant's invention provides that the surface of a coating 130 will become tacky enough to entrap contaminating particles which may be present within the electrical apparatus, but also provides a stability to the coating 130 so that it will not sag or slide from its deposition on the selected areas within the electrical apparatus.

Examples of the types of materials which can be utilized as the solvent vapor and the insulating coating 130 follow. The insulating coating can consist essentially of a vinyl material selected from vinyl chloride; vinyl chloride-vinyl acetate copolymers, preferably containing 90% to 98% by weight vinyl chloride; ethylene-vinyl acetate copolymers, preferably containing 70% to 98% by weight ethylene, and mixtures thereof as the binder component, with a phenolformaldehyde resin as the active component. All of these resins are well known in the art. The solvent vapor was trichloroethylene.

The ratio of the binder component:active component, can range from about 1:0.3 to 5.0 by weight. Experiments were carried out by placing standard pieces of copper wire 0.025 inches long with a 0.017 inch diameter on a coated aluminum substrate. The substrate was then exposed to an atmosphere of sulfur-hexafluoride gas at 45 psi (3 atmospheres) and the solvent vapor of trichoroethylene at 75 millimeters of mercury (0.1 atmosphere). The experiments were run at a temperature of 25° Celsius.

The results of the experiments showed, in one instance, that the copper wire stuck in the coating within 16 hours after the initiation of the experiment, and that the coating 130 did not move or sag after 170 hours, when the weight ratio of binder (vinyl chloride-vinyl acetate copolymer, containing about 92 wt.% vinyl chloride):active component (phenol-formaldehyde resin based on paraphenyl phenol) was 1:0.5. When the ratio of the same binder:active component was raised to 1:1, the copper wire stuck in the coating within 24 hours. When the ratio of the same binder; active component was raised to 1:9, an unacceptable coating was produced which sagged, and allowed penetration of the copper wire. The use of phenolic resins, vinyl chloride polymers, vinyl chloride-vinyl acetate copolymers or ethylene-vinyl acetate copolymers alone, will produce unsuitable coatings that are either non-tacky or sag on contact with solvent. Polystyrene was tried for comparative purposes and rejected, because it caused poor adhesion to the aluminum substrate.

From the foregoing, it will be apparent that there has been provided a novel means for captivating or rendering inactive minute contaminating particles within gas-filled transmission and distribution equipment of the type set forth in the illustrations. Where the distance between parts at different potentials are relatively short, the hazards of breakdown or flashover is a constant problem. This hazard is aggravated by the presence of contaminating conducting or semiconducting particles. By application of the coating described previously, which is hard or non-tacky during the assembly operation, the particles may be trapped in a selected region preferably in a low electric field by rendering the coating sticky or tacky by exposure to a solvent vapor. It is preferable to trap the particles 16 in a relatively low-gradient electric field, for instance, as shown by the coating 130 in FIG. 11 on the drawing, wherein it will be apparent that the coating 130 is on the inner surface of the outer grounded sheath or enclosure 142.

Thus, it can be seen that this invention discloses an organic polymer system, which can be coated onto metal tubes to leave a dry coating. This coating will soften in the presence of solvent vapor to leave a tacky surface to which small metallic particles will adhere, but which coating will not sag or slide. The solvent is compatible with sulfur-hexafluoride insulating gas and is equally effective at very low concentrations in this insulating gas.

I claim as my invention:
1. Gas-insulated electrical apparatus comprising:
    an outer conducting enclosure;
    an inner electrode disposed within, and spaced-apart from, said outer enclosure
    means for insulatably supporting said inner electrode within said outer enclosure;
    an insulating gas disposed within said outer enclosure and electrically insulating said inner electrode from said outer enclosure;

a solvent vapor comprising trichloroethylene intermixed with said insulating gas within said outer enclosure; and an initially relatively-hard, dry insulating coating disposed on selected surface areas of said electrical apparatus, said insulating coating having a surface thereof exposed to said insulating gas and said solvent vapor, said insulating coating comprising:

a binder component chemically insert to said insulating gas and said solvent vapor, said binder component being a vinyl selected from the group consisting of vinyl chloride, vinyl chloride-vinyl acetate copolymers, ethylene-vinyl acetate copolymers, and mixtures thereof; and an active component which interacts with said solvent vapor to become tacky thereafter, said active component being a phenolic resin, the ratio of said binder component:active component being about 1:0.3 to 5.0, said insulating coating, after exposure to said solvent vapor, becoming tacky on the surface thereof to entrap contaminating particles but maintaining its spatial position on said selected surface areas.

2. The apparatus according to claim 1 wherein said binder component is vinyl chloride-vinyl acetate copolymer containing 90 wt.% to 98 wt.% vinyl chloride, and said active component is a phenolic resin.

3. In electrical apparatus of the type having a pair of spaced metallic electrical members at different voltage potentials, an insulating gas disposed between said electrical members, means providing a relatively hard coating on the surface of one or more of said members, and a solvent vapor for rendering the surface of said coating tacky, the improvement comprising:

said coating being comprised of a binder component chemically inert to said insulating gas and said solvent vapor and an active component which interacts with said solvent vapor to therefore become tacky, the surface of said coating becoming tacky while the remainder of said coating remains relatively hard, said solvent vapor being trichloroethylene, said binder component being a vinyl chloride-vinyl acetate copolymer; and said active component being a phenolic resin, the ratio, by weight, of said binder component:active component being about 1:0.3 to 5.0.

4. The apparatus according to claim 3 wherein said active component is a paraphenyl phenol-phenolic resin.

5. The apparatus according to claims 1 or 4 wherein said insulating gas is sulfur-hexafluoride at a pressure of about three atmospheres and said trichloroethylene is at a pressure of about one-tenth atmosphere.

6. A method of entrapping contaminating particles in an enclosed electrical system including spaced-apart conducting members at different electric potentials and an insulating gas disposed intermediate said conducting members and providing electrical insulation therebetween, comprising the steps of:

providing a relatively hard insulating coating comprised of a binder component and an active component on selected surface areas within said enclosed electrical system, said insulating coating having an exposed surface thereof, said binder component being a vinyl selected from the group consisting of vinyl chloride, vinyl chloride-vinyl acetate copolymers, ethylene-vinyl acetate copolymers, and mixtures thereof and said active component being a phenolic resin, the ratio of said binder component:active component being about 1:0.3 to 5.0; and inserting a solvent vapor comprising trichloroethylene into said enclosed electrical system, said binder component being chemically inert to said solvent vapor, said active component interacting with said solvent vapor to render only the surface of said insulating coating tacky to thereby entrap contaminating particles thereon.

7. The method according to claim 6 wherein said binder component is a vinyl chloride-vinyl acetate copolymer containing 90 wt.% to 98 wt.% vinyl chloride.

* * * * *